United States Patent
Stonebraker

(10) Patent No.: US 9,289,926 B2
(45) Date of Patent: Mar. 22, 2016

(54) METHOD OF FORMING A COMPOSITE CLOSURE

(75) Inventor: Robert L. Stonebraker, Greencastle, IN (US)

(73) Assignee: Closure Systems International Inc., Crawfordsville, IN (US)

(*) Notice: Subject to any disclaimer, the term of this patent is extended or adjusted under 35 U.S.C. 154(b) by 407 days.

(21) Appl. No.: 13/581,229

(22) PCT Filed: Feb. 25, 2011

(86) PCT No.: PCT/US2011/026155
§ 371 (c)(1),
(2), (4) Date: Oct. 19, 2012

(87) PCT Pub. No.: WO2011/106586
PCT Pub. Date: Sep. 1, 2011

(65) Prior Publication Data
US 2013/0032596 A1 Feb. 7, 2013

Related U.S. Application Data

(60) Provisional application No. 61/308,450, filed on Feb. 26, 2010.

(51) Int. Cl.
*B29C 43/42* (2006.01)
*B29C 43/02* (2006.01)
(Continued)

(52) U.S. Cl.
CPC .............. *B29C 43/42* (2013.01); *B29C 43/027* (2013.01); *B65D 41/045* (2013.01); *B65D 51/1688* (2013.01); *B29L 2001/00* (2013.01); *B29L 2031/56* (2013.01)

(58) Field of Classification Search
CPC ..................................................... B29C 43/42
See application file for complete search history.

(56) References Cited

U.S. PATENT DOCUMENTS

| 3,189,209 A | 6/1965 | Owens |
| 3,689,625 A | 9/1972 | Zipper |

(Continued)

FOREIGN PATENT DOCUMENTS

| RU | 2114036 C1 | 6/1998 |
| RU | 2002127730 A | 3/2004 |

(Continued)

OTHER PUBLICATIONS

International Search Report and Written Opinion for corresponding PCT application No. PCT/US2011/026155 mailed Apr. 26, 2011.

*Primary Examiner* — Larry Thrower
(74) *Attorney, Agent, or Firm* — Wood, Phillips, Katz, Clark & Mortimer

(57) ABSTRACT

A method of manufacturing a composite closure, including an outer closure cap and an inner sealing liner, comprises providing a closure cap having an annular skirt portion including an annular lip that defines an annular recess adjacent a top wall portion of the cap. Molten plastic is compression molded within the closure cap to form the inner sealing liner adjacent the top wall portion, with the periphery of the sealing liner positioned within the annular recess of the closure cap. A plurality of circumferentially spaced gussets are provided within the annular recess for controlling the flow of the molten plastic during liner formation, thereby facilitating the venting of air to abate formation of voids in the sealing liner.

1 Claim, 1 Drawing Sheet

(51) Int. Cl.
  *B65D 41/04* (2006.01)
  *B65D 51/16* (2006.01)
  *B29L 1/00* (2006.01)
  *B29L 31/56* (2006.01)

(56) References Cited

U.S. PATENT DOCUMENTS

| 4,407,422 | A | 10/1983 | Wilde et al. |
| 4,664,280 | A | 5/1987 | Whitney et al. |
| 5,265,747 | A | 11/1993 | Gregory et al. |
| 6,103,170 | A | 8/2000 | Gregory |
| 6,306,330 | B1 | 10/2001 | Cerny |
| 7,306,108 | B2 | 12/2007 | Cleevely |
| 7,867,425 | B2 | 1/2011 | Major |
| 2005/0224447 | A1 | 10/2005 | Cleevley |
| 2006/0032831 | A1 | 2/2006 | Major |
| 2006/0169723 | A1 | 8/2006 | Friedman |

FOREIGN PATENT DOCUMENTS

| RU | 2361793 C2 | 7/2009 |
| RU | 2370422 C2 | 10/2009 |

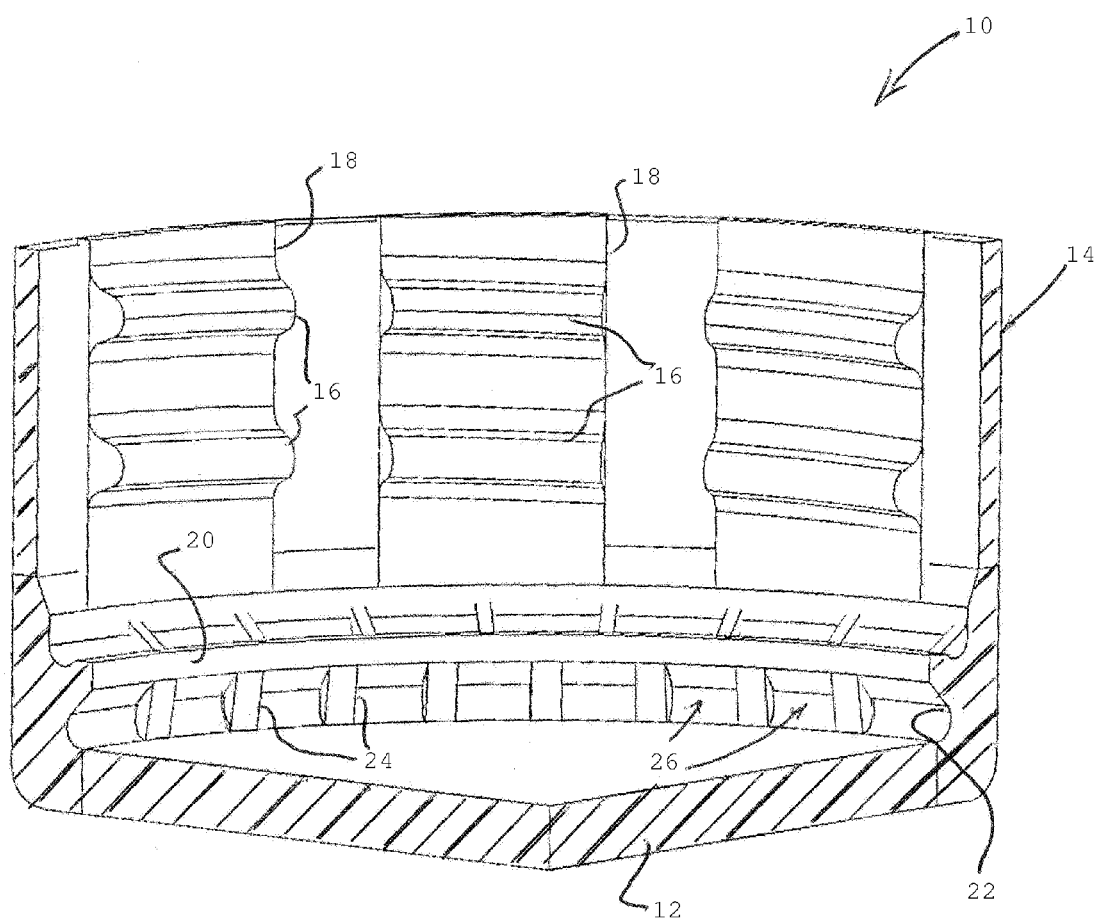

METHOD OF FORMING A COMPOSITE CLOSURE

TECHNICAL FIELD

The present invention generally relates to manufacture of composite plastic closures, including an outer closure cap, and inner sealing liner, and more particularly to a method of forming a composite closure, including compression molding of a sealing liner within an outer closure cap, including controlling the flow of the molten plastic liner-forming material circumferentially of an annular recess defined by the outer closure cap, and facilitating venting of air from within the closure cap during liner formation.

BACKGROUND OF THE INVENTION

Composite plastic closures, formed from suitable polymeric materials, have meet with widespread acceptance in the market place, these types of closures typically include an outer closure cap or shell, typically formed from polypropylene or other polymeric material, in an inter-sealing liner, typically formed from ethylene vinyl esotate (EVA) or other suitable material. Formation of these types of closures by a compression molding process has proven to be particularly commercially viable, permitting highly efficient formation of composite closures which can provide very good sealing performance such as on carbonated beverages or the like. U.S. Pat. No. 4,497,765, hereby incorporated by reference discloses techniques for compression molding of such composite closures, including compression molding of the outer closure cap, and compression molding of a sealing liner within the outer closure cap.

The compression molding process by which such closures are formed typically entails introduction of a pre-determined quantity of molten polymeric material into a compression mold, for closure cap formation, or into the outer closure cap itself for liner formation. For compression molding of the sealing liner, a quantity of molten, liner-forming plastic material, typically in the form of a pellet, is introduced into the outer closure cap, typically when the outer cap is in an inverted position, and the pellet of molten plastic material is positioned on an inside surface of a top wall portion of the outer closure cap. To facilitate formation of the sealing liner with the desired configuration to form a so-called top/side seal, including an inwardly facing sealing surface, the outer closure cap is formed with an annular skirt portion having an annular seal lip which is positioned in closely spaced relationship to the top wall portion of the closure cap, and defining an annular recess therewith.

During liner formation a liner-forming tooling assembly is inserted into the outer closure cap, and an outer sleeve of the assembly advanced to engage the annular seal lip of the outer closure cap. Thereafter, an inner plunger of the tooling assembly is advanced relative to the outer sleeve to compression mold the pellet of molten plastic material, thereby forming the sealing liner adjacent the top wall portion of the enclosure cap. The sealing liner includes a central, disc-shaped portion, and an integral annular sealing bead portion which is at least partially positioned within the annular recess of the outer closure cap.

Attendant to high-speed closure manufacture, including compression molding of sealing liners as described above, there can be problems with air becoming trapped in the region within which the sealing liner is being formed. Because the venting of the tooling assembly is provided at the interface between the tooling and the seal lip, air trapped within the annular recess beneath the seal lip cannot reach the vent and becomes trapped in the recess. As a consequence, the trapped air can undesirably result in air bubbles being formed in the sealing liner. Some of these air bubbles can be large enough to cause the seal to fail when the closure is applied to an associated container. Trapped air can extend as much as 45 degrees or more around the periphery of the closure. As the liner continues to form, it compresses this air pocket into one area, and when the tooling is no longer there to keep it compressed, it expands creating a large bubble that interferes with the sealing on an associated container.

Notably, the type and quantity of defects which can result from such trapped air is highly dependent upon the specific positioning of the molten plastic pellet on the inside surface of the top wall portion of the outer closure cap. If the pellet is in the very center of the top wall portion, a relatively large quantity of bubbles, and relatively large bubbles, are undesirably produced. As the location at which the pellet is position is moved away from the very center of the top wall portion, the resultant air bubbles are reduced in size and number, but the molding process results in a larger size of, and larger quantity of "knit" lines (where portions of the plastic material flow into each other), non-fills, and flash. There is typically no pellet location that results in no defects being formed. As a consequence, machine operators have found it advantageous to run equipment so that the molten pellet is positioned slightly off-center, thereby avoiding formation of excessively large air bubbles, while limiting formation of knit lines, non-fills, and flash. Significantly, the difference in pellet positioning between formation of acceptable air bubbles and non-fills and flash can be as little as 0.020 inches or 0.030 inches. Considering the high-speed operation of the machinery, such careful positioning of the pellet formation poses a very delicate "balancing act" to optimize the liner-forming process.

The specific configuration of the liner profile can influence formation of air bubbles. For some profiles, it is virtually impossible to eliminate air bubbles from closures being formed. For some different types of liner profiles, any where from 40% to 60% of the liners may exhibit air bubbles. Other profiles may exhibit air bubbles in 50% to 100% of the products being formed. While such air bubble formation is generally accepted as a "passable defect" it will be appreciated that in attempting to avoid "non-passable bubbles" the liner-forming process can be precariously close to producing liners exhibiting flash and non-fill portions.

It has been recognized that if the problem of air bubble formation could be eliminated, it would permit the liner-forming process to be performed by placement of the molten pellet in the center of the top wall of the closure, thus desirably acting to reduce other defects, such as knit lines, non-fills, and flash, and thus making the liner-forming process more robust and resistant to other variations in the process, including changes in the amount and type of liner-forming material, and changes in the liner profile.

SUMMARY OF THE INVENTION

In accordance with the present invention, a method of forming composite closures is disclosed which specifically addresses the problem of creation of air bubbles which can result from air being trapped during the compression molten liner-forming process. In particular, the present invention contemplates controlling the flow of plastic material within the closure cap, particularly flow circumferentially of the closure, and facilitating venting of air during liner formation. This is achieved by the provision of a plurality of radially-oriented gussets provided in an annular recess of the outer closure cap, by which the flow of molten plastic material during liner formation is desirably controlled. By configuring the gussets to each have an inner edge positioned substantially at an inside diameter of an annular seal lip that defines the annular recess, air trapped within the recess can escape along the gussets to the vent provided in the mold tooling.

In accordance with the present invention, a method of forming a composite closure comprises the steps of providing an outer closure cap including a top wall portion, and an annular skirt portion depending from the top wall portion. The skirt portion includes an inwardly extending, annular seal lip positioned in closely spaced relationship to the top wall portion to define an annular recess.

The present method further includes providing a quantity of molten, liner-forming plastic material. The pellet is positioned within the outer closure cap adjacent the top wall portion thereof, typically by positioning the pellet on the inside surface of the top wall portion as the closure cap is positioned in a generally inverted position.

Liner formation is effected by advancing a liner-forming tooling assembly into the closure cap to compression mold the quantity of molten plastic material, to thereby form a sealing linear adjacent the top wall portion of the closure cap. The sealing liner includes a central disk-shaped portion, and an annular sealing bead portion at least partially positioned within the annular recess of the outer closure cap.

The liner-forming tooling assembly includes an outer sleeve, and an inner plunger. During liner formation, the outer sleeve is advanced into the closure cap to engage the annular seal lip. Thereafter, the inner plunger of the tooling assembly is advanced relative to the outer sleeve to compression mold the quantity of plastic material.

In accordance with the present invention, the flow of molten plastic material circumferentially of the annular recess is controlled, as the material is compression molded, by the provision of a plurality of radially-oriented gussets circumferentially spaced about and positioned within the annular recess of the outer closure cap. Each of the gussets extends vertically from the annular seal lip to the top wall portion, and each includes an inner edge positioned in substantial alignment with an inside diameter of the annular seal lip. By this arrangement a plurality of compartments are defined in the annular recess between adjacent ones of the gussets. Significantly, alignment of the inner edge of each gusset with the inside diameter of the seal lip of the closure cap facilitates venting of any trapped air along the gusset inwardly of the closure to the venting provided in the tooling assembly at the inside diameter of the seal lip.

Other features and advantages of the present invention will be readily apparent from the following detailed description, the accompanying drawings, and the appended claims.

DESCRIPTION OF THE DRAWINGS

FIG. 1 is a diagrammatic, cross-sectional view of a closure for practicing the present invention.

DETAILED DESCRIPTION

While the present invention is susceptible of embodiment in various forms, therein shown in the drawings and will hereinafter by described a presently preferred embodiment, with the understanding that the present disclosure is to be considered as an exemplification of the invention, and is not intended to limit the invention to the specific embodiment illustrated.

With reference to FIG. 1, therein is illustrated an outer closure cap 10 configured for practicing the present invention. The present invention contemplates a method of compression molding a sealing liner within the outer closure cap 10, by which the flow of molten plastic material is controlled to limit and minimize formation of unacceptably large air bubbles within the liner material, while at the same time facilitating venting of trapped air, thus facilitating formation of sealing liners which do not exhibit other undesirable defects, such as excessive knit lines, non-filled regions, or flashing.

In particular, the closure of the present invention includes the outer closure cap 10 having a top wall portion 12, and annular skirt portion 14 depending there from. The annular skirt portion typically includes an internal thread formation 16 for threaded engagement with an external thread formation of an associated container to which the closure can be applied. One or more gas-venting grooves 18 can be provided along the inside surface of the annular skirt portion 14 to facilitate venting a gas from within an associated container, such as having carbonated contents, during closure removal. The closure may include a tamper-indicating pilfer band (not shown) which depends from the annular skirt portion for cooperative engagement with the associated container, to thereby provide visually discernable evidence of partial or complete closure removal from the container.

A sealing liner (not shown) formed within the outer closure cap 10 includes a disk-shaped central portion and an annular sealing bead portion, which together provide a so-called top/side seal with the associated container. To this end, the skirt portion 14 of the outer closure cap 10 includes an annular seal lip 20 positioned in closely spaced relationship to the top wall portion of the outer closure cap. The annular seal lip thus defines an annular recess 22, with the sealing bead portion of the sealing liner at least partially positioned within the annual recess.

As shown, practice of the present invention is effected by providing the outer closure cap with a plurality of circumferentially spaced gussets 24 positioned within the annular recess 22 of the outer closure cap 10. The gussets are radially-oriented, and extend from the annular seal lip to the top wall portion, each having an inner edge position substantially at and aligned with an inside diameter of the annular seal lip 20. By this arrangement, the gussets define a plurality of compartments 26 in the annular recess between adjacent ones of the gussets.

A typical composite closure for a carbonated beverage can have a 28 mm diameter. For such a closure construction, thirty-six (36) of the gussets can be provided, each gusset being between about 0.015 and 0.025 inches wide. Each gusset extends from the inside diameter of the seal lip to the wall of the closure in the area under the seal lip 20 in the annular recess 22.

Development has shown that the addition of the gussets 24 under the seal lip 20 of 28 mm lined closures substantially eliminates bubbles in the liner. Testing has shown that the bubble elimination mechanism that the gussets provide is very robust. All bubbles are eliminated across a number of variables. Such variables include process parameters (e.g. pellet weight, press, temperature, pellet position, etc.), material color (blue/gray), tooling design (standard forming sleeves, as well as variations therein) and for different liner profiles. Significantly, the provision of the gussets effectively abates the bubble producing mechanisms in the lining process.

In particular, the provision of the gussets 24 acts to control and restrict the circumferential flow of liner material around the seal area within the annular recess 22. It has been demonstrated that at least one bubble-producing mechanism occurs when the liner-forming pellet is slightly off-center of the top wall portion 12. The pellet being slightly off-center causes the liner material to reach the seal area of the closure on one side of the closure before the material reaches the other. Once it reaches the seal area, the material "races" or flows circumferentially, both clockwise and counterclockwise, around the annular recess of the closure at a higher rate than the material flowing across the center panel, since the seal cross-sectional area is larger than the center cross-sectional area. If the circumferential flow-front and the center panel flow-front come together in the right sequence, it can undesirably result in a bubble in the liner.

The gussets 24 desirable act to compartmentalize the trapped air, and provide a path for the air to escape under the seal lip of the closure. It has been shown that another bubble producing mechanism occurs when the pellet is in the center of the top wall portion of the outer closure cap 10. When the pellet is in the center the liner material flows radially from the center to the outside of the closure. As the material flows under the liner sleeve, because of the shape of the flow-front, it can trap air under the annular seal lip 20. This trapped air has no way to escape, and can extend about the periphery of the seal area for a relatively long distance, as much as 45° or more. At the conclusion of the liner-forming process, the pressure in the molding area can increase, and the trapped air can be compressed into a localized area of the liner. This mechanism can be undesirable resulting in large, non-passable, ballooning bubbles.

Thus, the gussets 24 desirably act to compartmentalize any air in the annular recess 22 into smaller areas. As a consequence, the air is not compressed as much as it would be if it was one relatively large "ring" of air. As a result, when the mold tooling is withdrawn from the closure cap 10, there is less expansion into the sealing area. Additionally, the gussets 24 act to distribute trapped air around more of the periphery of the closure so the air does not have to vent in one small area of the vent, it is venting around more of the available vent area. Thus, the provision of the radially-oriented gussets 24 creates a like number of small compartments 26 between adjacent ones of the gussets under the seal lip 20, within the annular recess 22 of the closure cap 10, that desirably act to keep air distributed around the seal area, and prevent air from being compressed into one localized area.

Significantly, there is a very sharp radius where each gusset 24 intersects with the associated portion of the closure. As the liner is being formed, the liner-forming material does not fully pack into these sharp corners until near the end of the formation of the liner, when the pressures increase, leaving a path for air to escape along the sharp corners from under the seal lip to near the vent area of the tooling. Venting of air in this fashion is facilitated by substantially aligning the inner edge of each gusset 24 with the inside diameter of the seal lip 20. The sharp corner radius of each gusset, which is preferably no more than about 0.001 inches, provides a flow path from beneath the seal lip to vents provided in the mold tooling assembly at the inside diameter of the seal lip 20. Sharp corners in a mold (i.e., closure cap 10) are the last places to fill because it takes higher pressure to form into these sharp geometries. The higher pressures are not seen until the mold is nearly full and the material can no longer flow easily. By that time, the mold is nearly full and the air has already escaped along paths provided at these sharp corners. By the time the liner material fully forms into these sharp corners, the air is already gone.

Thus, practice of the present invention desirably acts to eliminate bubbles during the liner-forming process, including the use of sharp geometries at the edges of gussets 24 to provide a vent path that is open from areas that are difficult to vent to areas that are more easily vented. Notably, the provision of the radially-oriented gussets effectively replaces liner-forming material with the material from which the closure shell is formed, thus desirably providing material cost savings. The provision of the gussets desirably acts to strengthen the seal lip, and the gussets can be desirably retrofitted to existing tooling without inordinate expense, since the tooling can merely be altered to permit to provide formation of the gussets. By practice of the present invention, during closure liner formation, the molten pellet can be directed to the center of the inside surface of the top wall, thus desirably resulting in improved liner formation.

From the foregoing, it will be observed that numerous modifications and variations can be affected without departing from the true spirit and scope of the novel concept of the present invention. It is to be understood that no limitation with respect to the specific embodiment illustrated herein is intended or should be inferred. The disclosure is intended to cover, by the appended claims, all such modification as fall within the scope of the claims.

What is claimed is:

1. A method of forming a composite closure, comprising the steps of:

providing an outer closure cap including a top wall portion, and an annular skirt portion depending from said top wall portion, said skirt portion including an inwardly extending, annular seal lip positioned in closely spaced relationship to said top wall portion to define an annular recess;

providing a quantity of molten, liner-forming plastic material in the form of a pellet, and positioning said pellet within said outer closure cap adjacent the top wall portion thereof; and advancing a liner-forming tooling assembly into said closure cap to compression mold said quantity of molten plastic material to form a sealing liner adjacent said top wall portion of said closure cap, said sealing liner including a central portion, and an annular sealing bead portion at least partially positioned within said annular recess, said advancing step including advancing an outer sleeve of said tooling assembly into said closure cap to engage said annular seal lip, and thereafter advancing an inner plunger of said tooling assembly relative to said outer sleeve to compression mold said quantity of plastic material, including controlling the flow of the molten plastic material circumferentially of said annular recess, as the molten plastic material is compression molded, by providing said outer closure cap with a plurality of radially-oriented gussets circumferentially spaced about and positioned within said annular recess, each of said gussets extending vertically from said annular seal lip to said top wall portion, and each having an inner edge positioned in substantial alignment with an inside diameter of said annular seal lip, to thereby define a plurality of compartments in said annular recess between adjacent ones of said gussets, and to facilitate venting of air from within said annular recess.

* * * * *